United States Patent
Kitayama et al.

(10) Patent No.: US 8,974,357 B2
(45) Date of Patent: Mar. 10, 2015

(54) VERTICAL TURRET LATHE

(75) Inventors: Minoru Kitayama, Aichi-pref. (JP); Naoya Tanaka, Toki (JP); Eiji Takeuchi, Aichi-pref. (JP); Toraharu Ryuta, Aichi-pref. (JP); Hyunkoo Park, Nagoya (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 1045 days.

(21) Appl. No.: 12/732,326

(22) Filed: Mar. 26, 2010

(65) Prior Publication Data
US 2010/0242694 A1   Sep. 30, 2010

(30) Foreign Application Priority Data

Mar. 31, 2009   (JP) .................................. 2009-084925

(51) Int. Cl.
| | |
|---|---|
| B23B 29/24 | (2006.01) |
| B23Q 3/155 | (2006.01) |
| B23B 3/10 | (2006.01) |

(52) U.S. Cl.
CPC .............. *B23Q 3/15506* (2013.01); *B23B 3/10* (2013.01); *B23B 29/24* (2013.01)
USPC ................... 483/17; 483/19; 483/27; 82/121; 82/122; 82/159

(58) Field of Classification Search
CPC ........ B23B 29/24; B23B 29/28; B23B 29/30; B23B 29/34
USPC .......... 82/121, 122, 158–160; 483/17, 19, 27, 483/22, 24, 26, 59; 279/2.06, 2.09, 2.12
See application file for complete search history.

(56) References Cited

U.S. PATENT DOCUMENTS 3,412,459 A * 11/1968 Hollis ............................... 483/9
3,465,890 A *  9/1969 Wakefield et al. .............. 483/59
(Continued)

FOREIGN PATENT DOCUMENTS

| FR | 2 467 052 | 4/1981 |
|---|---|---|
| JP | 60-232843 | 11/1985 |

(Continued)

OTHER PUBLICATIONS

English Translation of JP 2008-080416.*
(Continued)

*Primary Examiner* — Daniel Howell
*Assistant Examiner* — Ryan Rufo
(74) *Attorney, Agent, or Firm* — Renner, Otto, Boisselle & Sklar, LLP

(57) ABSTRACT

The invention provides a vertical turret lathe capable of preventing an inner diameter turning tool attached to a turret tool rest from interfering with a workpiece during machining of the outer diameter of the workpiece. The vertical turret lathe comprises a work table that holds a workpiece $W_1$ and rotates, and a working head 40 having a turret tool rest 50 and capable of moving in X-axis and Z-axis directions. A tool holder 70 for holding an inner diameter turning tool $T_2$ via hydraulic pressure is attached to a part of the tool supporting portions 60 of the turret tool rest. The automatic tool changer apparatus 100 includes a turret-type tool magazine 120 and pistons 160 and 162, which mechanically press the pins 74 and 76 of the tool holder 70 and clamp or unclamp the tool $T_2$.

3 Claims, 12 Drawing Sheets

(56) References Cited

U.S. PATENT DOCUMENTS

| | | | |
|---|---|---|---|
| 3,662,442 A * | 5/1972 | Noa | 483/27 |
| 3,726,001 A * | 4/1973 | Anderson et al. | 483/21 |
| 3,775,837 A * | 12/1973 | Tomita et al. | 483/7 |
| 3,893,227 A * | 7/1975 | Suzuki et al. | 483/41 |
| 3,947,951 A * | 4/1976 | Jerue | 483/40 |
| 4,182,021 A * | 1/1980 | Kato et al. | 483/59 |
| 4,321,746 A * | 3/1982 | Grinage | 483/9 |
| 4,541,165 A * | 9/1985 | Sawai et al. | 483/21 |
| 4,601,094 A | 7/1986 | Myers | |
| 6,193,451 B1 * | 2/2001 | Åsberg | 409/233 |
| 2003/0134731 A1 * | 7/2003 | Komine | 483/27 |
| 2007/0042882 A1 * | 2/2007 | Konvicka et al. | 483/14 |

FOREIGN PATENT DOCUMENTS

| | | |
|---|---|---|
| JP | 06-134640 A * | 5/1994 |
| JP | 08-309638 | 11/1996 |
| JP | 2008-080416 | 4/2008 |

OTHER PUBLICATIONS

European Search Report for corresponding European Application No. 10405068.7 dated Jul. 20, 2010.

Office Action from corresponding Japanese application No. 2009-084925 dated Mar. 12, 2013.

* cited by examiner

VERTICAL TURRET LATHE

The present application is based on and claims priority of Japanese patent application No. 2009-084925 filed on Mar. 31, 2009, the entire contents of which are hereby incorporated by reference.

BACKGROUND OF THE INVENTION

1. Field of the Invention

The present invention relates to a vertical turret lathe, and more specifically, to a vertical turret lathe equipped with an automatic tool changer apparatus.

2. Description of the Related Art

A turret lathe has twelve turning tool mounting portions formed on the circumference of a turret tool rest, for example, and is capable of realizing efficient machining in a short time by selecting appropriate tools.

Japanese patent application laid-open publication No. 2008-80416 (patent document 1) discloses an automatic tool changer apparatus in a turret lathe. The turret lathe is equipped with a tool holder capable of clamping and unclamping a tool via hydraulic pressure with respect to the turret tool rest, and an apparatus for automatically changing multiple tools.

However, according to the disclosure of patent document 1, hydraulic pressure is supplied to a tool holder positioned at an automatic tool changing position using a hydraulic oil supplying means capable of being attached and removed via a socket.

According to the disclosed arrangement, defects are caused by the leakage of hydraulic oil from the circuit, the foreign substances coming into the circuit, and so on.

SUMMARY OF THE INVENTION

The present invention aims at solving the problems of the prior art by providing an automatic tool changer apparatus of a vertical turret lathe capable of automatically changing the tools on a turret tool rest using a tool holder having mechanically operated pins, without having to apply hydraulic pressure from the exterior.

The vertical turret lathe according to the present invention comprises, as basic means, a work table holding a workpiece and rotating, a working head moving in X-axis and Z-axis directions, and a turret tool rest disposed on the working head within a machining area, the vertical turret lathe comprising a tool holder disposed on a tool attachment portion on the turret tool rest, and an automatic tool changer apparatus disposed outside the machining area for automatically changing the tools on the tool holder, wherein the tool holder comprises a pair of mechanically operated pins, and a means for clamping or unclamping the tool via hydraulic pressure in response to the operation of the pins, wherein the automatic tool changer apparatus comprises a tool magazine facing the tool holder for changing the tools, and a pair of cylinders for operating the pins on the tool holder.

Further, the automatic tool changer apparatus comprises a frame, a slide rail disposed on the frame, and an automatic tool changer unit moving on the slide rail and changing tools within the machining area, wherein the automatic tool changer unit comprises a turret-type tool magazine, and the turret-type tool magazine comprises a gripper for gripping the tool, and a spring for biasing the gripper towards the closing direction.

Moreover, the vertical turret lathe further comprises a door for the automatic tool changer unit to enter the machining area.

According to the present invention, a long-sized inner diameter turning tool or the like can be attached to the tool holder in a changeable manner, so that during machining of the outer diameter of a workpiece, the inner diameter turning tool can be prevented from interfering with the workpiece, and the processing of various types of workpieces can be performed without performing tooling changes.

DETAILED DESCRIPTION OF THE PREFERRED EMBODIMENTS

Figure 1:
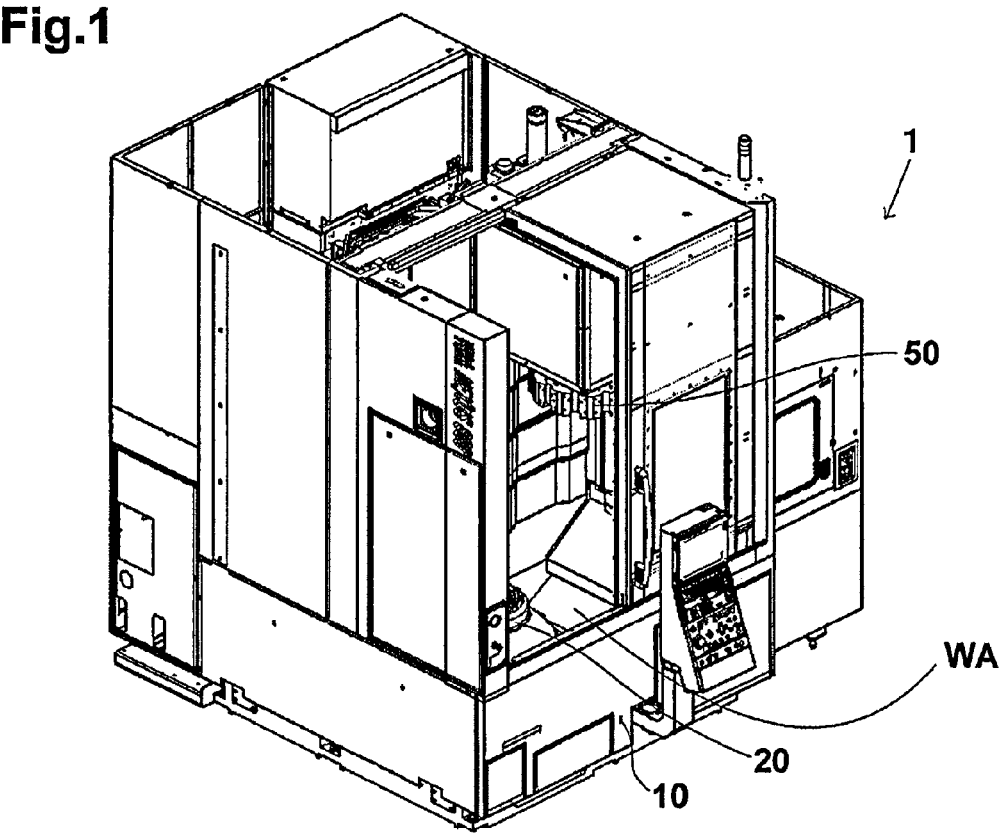
FIG. 1 is an external view of a vertical turret lathe according to the present invention.
Figure 2:
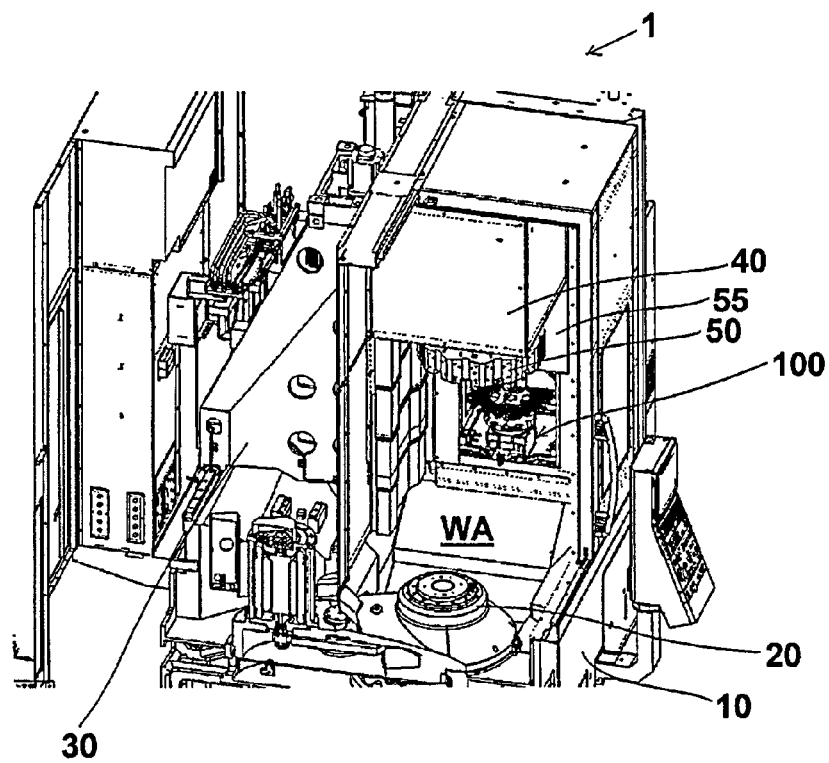
FIG. 2 is an explanatory view showing the mechanical structure of a relevant portion thereof.

FIG. 1 is an external view of a vertical turret lathe for realizing the present invention, and FIG. 2 is an explanatory view showing the mechanical structure of the relevant portion thereof.

The vertical turret lathe denoted as a whole by reference number 1 has a work area WA provided on a base 10, and a work table 20 that grips a workpiece and rotates.

A column 30 that moves along an X axis is provided on the base 10, and on the column 30 is disposed a working head 40 that moves along a Z axis parallel to a rotation axis of the work table 20. A turret tool rest 50 is rotatably disposed on the working head 40 in an allocatable manner.

Figure 3:
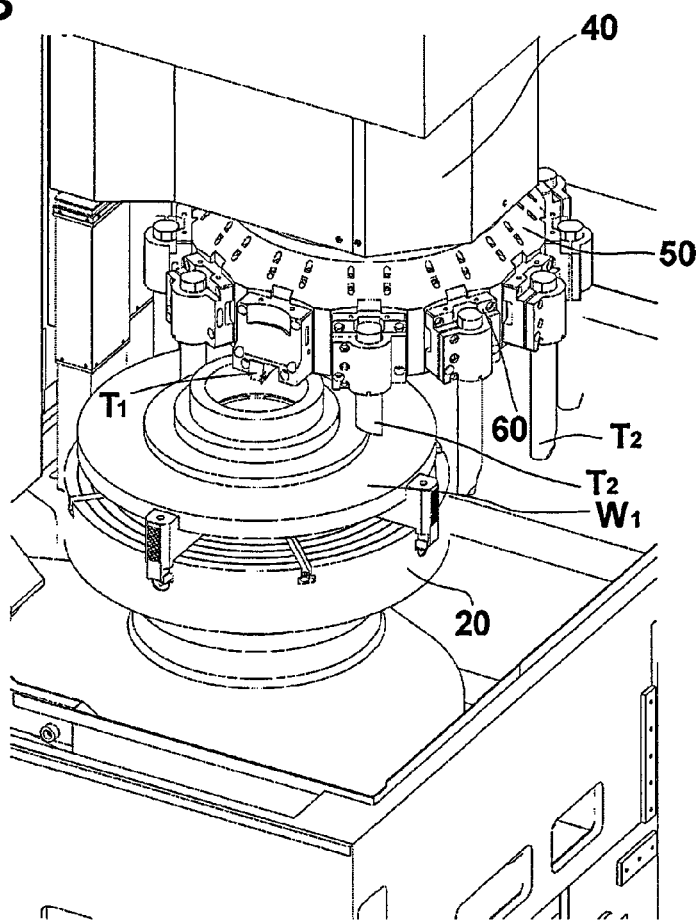
FIG. 3 is an explanatory view showing an outline of a common turret lathe.

FIG. 3 is an explanatory view showing the outline of a common turret lathe.

The turret tool rest 50 has, for example, a dodecagon shape, and includes twelve tool supporting portions 60. Outer diameter turning tools $T_1$ and inner diameter turning tools $T_2$ are disposed on the respective tool supporting portions 60.

The outer diameter turning tool $T_1$ performs machining of the outer diameter portion of a workpiece $W_1$ held on a work table 20. The inner diameter turning tool $T_2$ performs machining of the inner diameter portion of the workpiece $W_1$, and the protrusion length of the inner diameter turning tool $T_2$ is long.

This causes a drawback in that the inner diameter turning tool $T_2$ interferes with the workpiece $W_1$ during machining of the outer diameter portion.

Therefore, to cope with this problem in a realistic manner, the occurrence of interference is prevented by attaching the inner diameter turning tool on a tool holder at a distant position and not attaching the inner diameter turning tool on the adjacent tool holders. This method, however, limits the number of tools to be attached to the turret tool rest 50 and causes deterioration of machining efficiency.

The vertical turret lathe according to the present invention improves the machining efficiency thereof by attaching an automatic tool changer apparatus to either temporarily remove the inner diameter turning tool, from the turret tool rest or change the tool to an inner diameter turning tool most suitable for machining.

As shown in FIG. 2, an automatic tool changer apparatus 100 is arranged adjacent to the work area WA, and a door 55 closes and separates the automatic tool changer apparatus 100 from the work area WA having the work table 20 and the turret tool rest 50 during machining.

Figure 4:
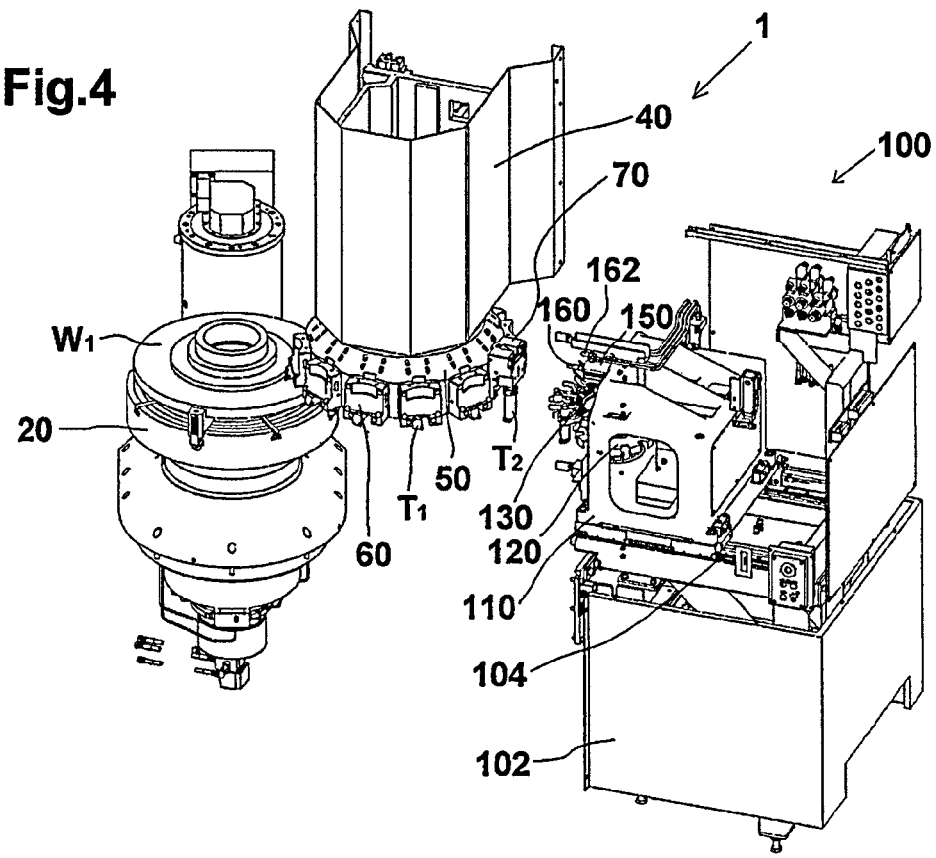
FIG. 4 is an explanatory view showing the structure of a turret tool rest and an automatic tool changer apparatus.
Figure 5:
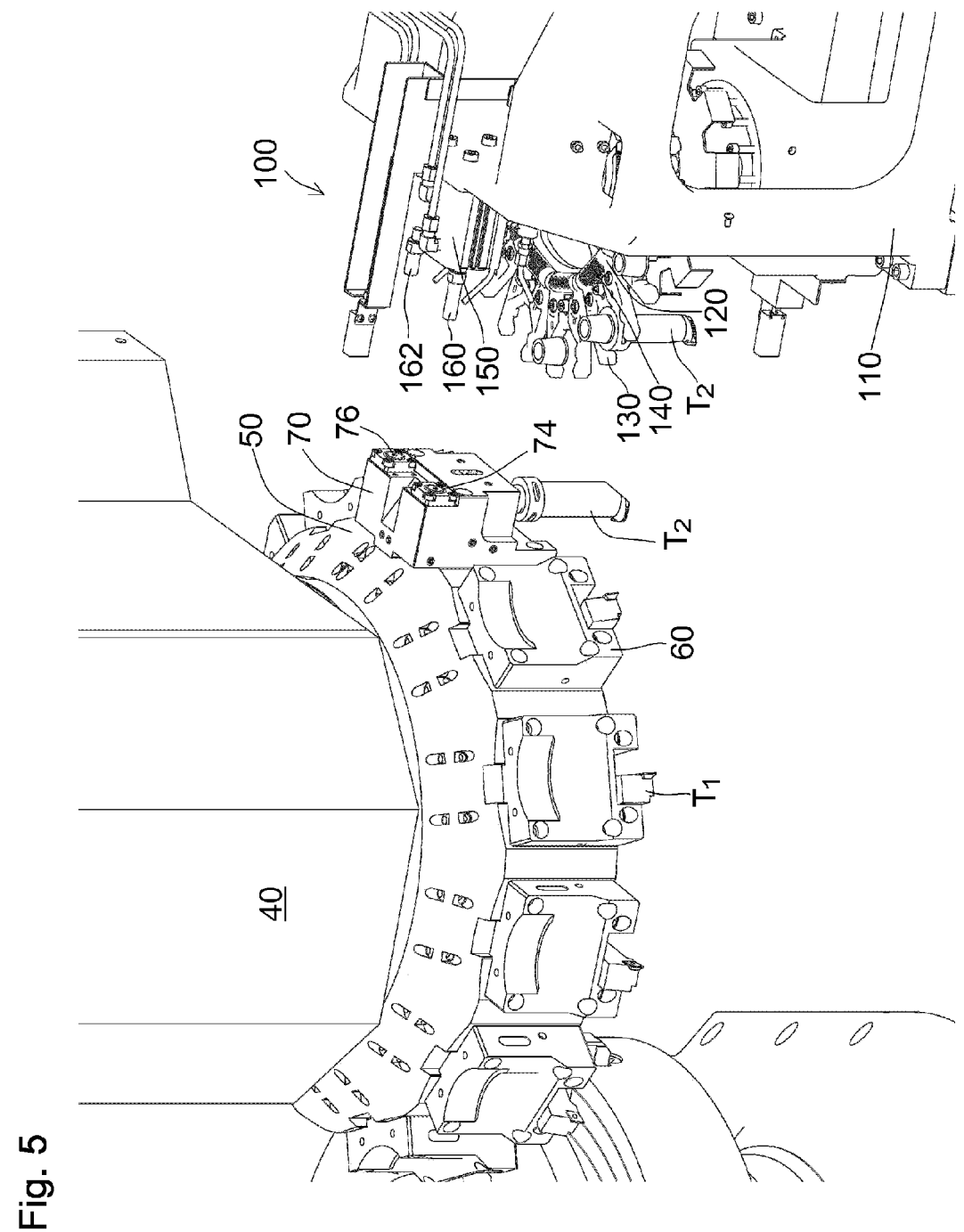
FIG. 5 is an explanatory view showing the structure of a turret tool rest and an automatic tool changer apparatus.

FIGS. 4 and 5 are explanatory views showing the structure of the turret tool rest 50 and the automatic tool changer apparatus 100.

A tool holder 70 described later is disposed on the tool supporting portion 60 of the turret tool rest 50, and an automatic tool changer apparatus 100 is disposed to face to the tool holder 70.

The automatic tool changer apparatus 100 has a guide rail 104 disposed on a frame 102, and an automatic tool changer unit 110 is disposed movably on the rail 104.

The automatic tool changer unit 110 has a turret-type tool magazine 120. The tool magazine 120 has a pair of grippers 130 and a spring 140 that biases the gripper 130 toward the closing direction.

The inner diameter turning tool $T_2$ held via the gripper 130 can be drawn out resisting against the force of the spring 140 by applying force toward the outer direction, and the tool can also be pushed into the gripper.

The tool holder 70 has a pair of pins 74 and 76 that are pushed in and out alternately, and the tool $T_2$ can be clamped and unclamped by alternately pushing in the pins 74 and 76.

The automatic tool changer unit 110 has a cylinder 150, and the two pistons 160 and 162 thereof are driven alternately to manipulate the pins 74 and 76 of the tool holder 70.

Figure 6:
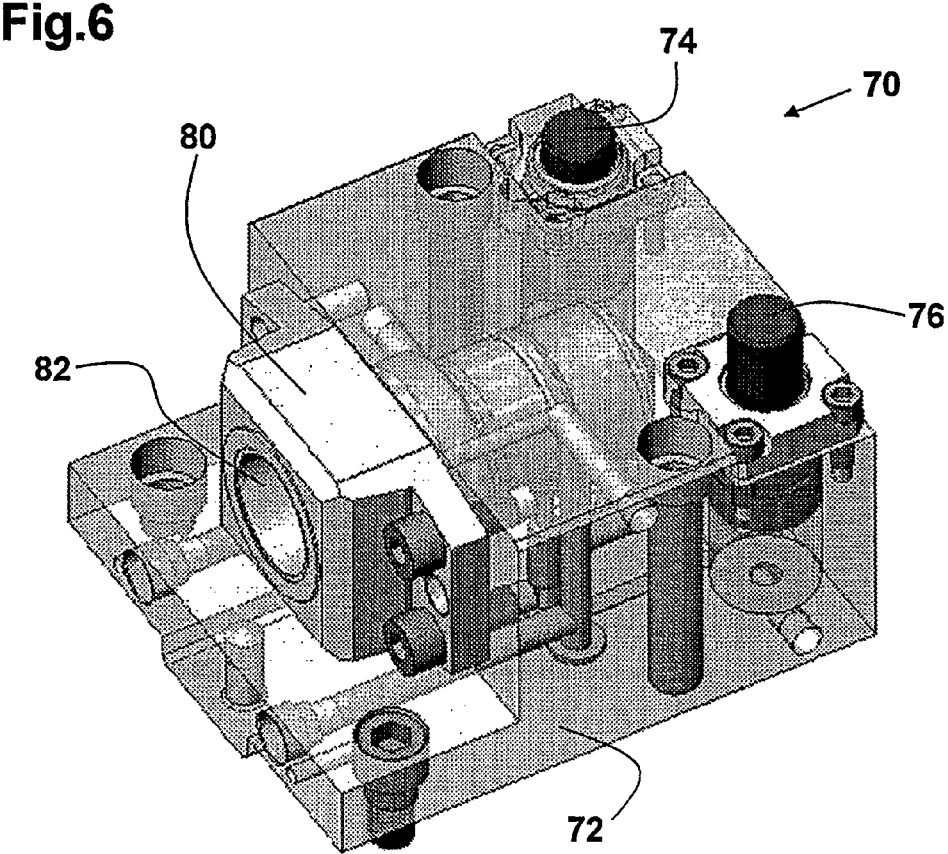
FIG. 6 is an external view of a tool holder.
Figure 7:
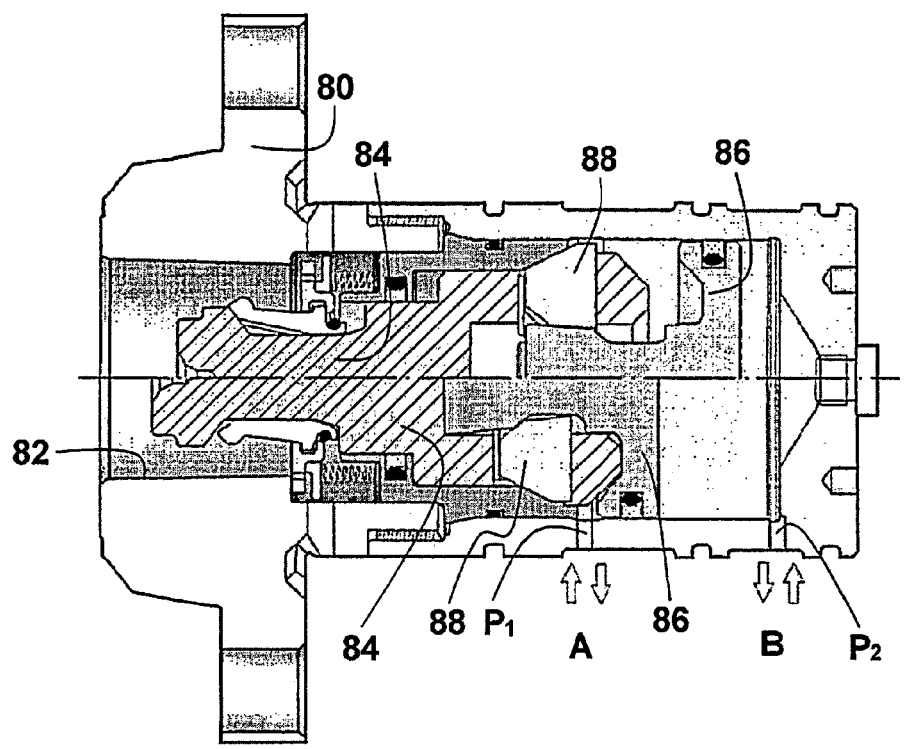
FIG. 7 is a cross-sectional view of a tool holder unit.
Figure 8:
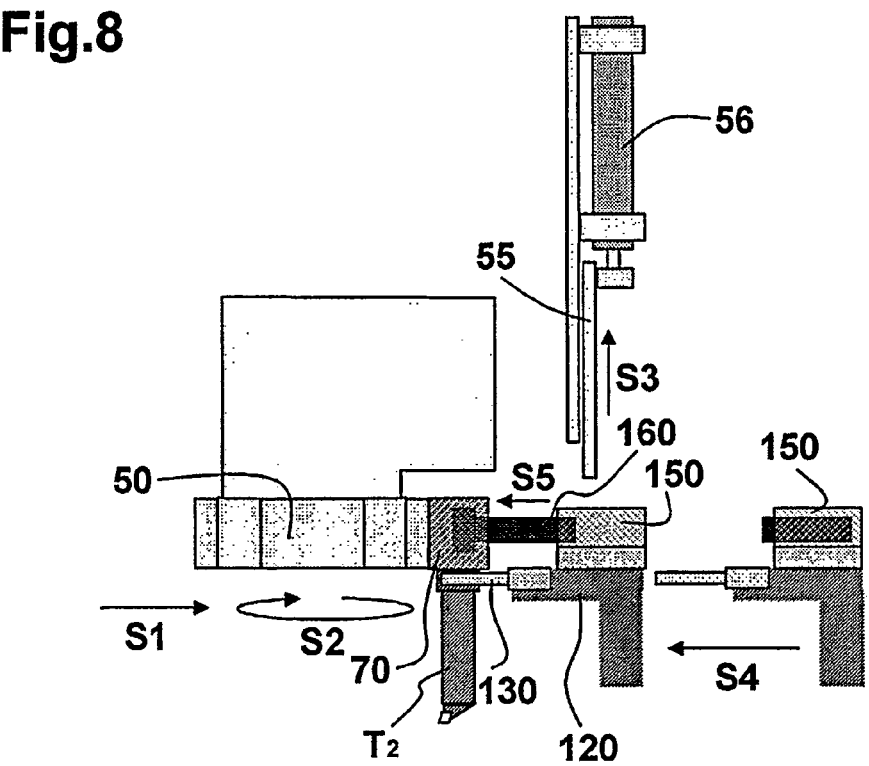
FIG. 8 is an explanatory view showing the operation of the automatic tool changer apparatus according to the present invention.
Figure 9:
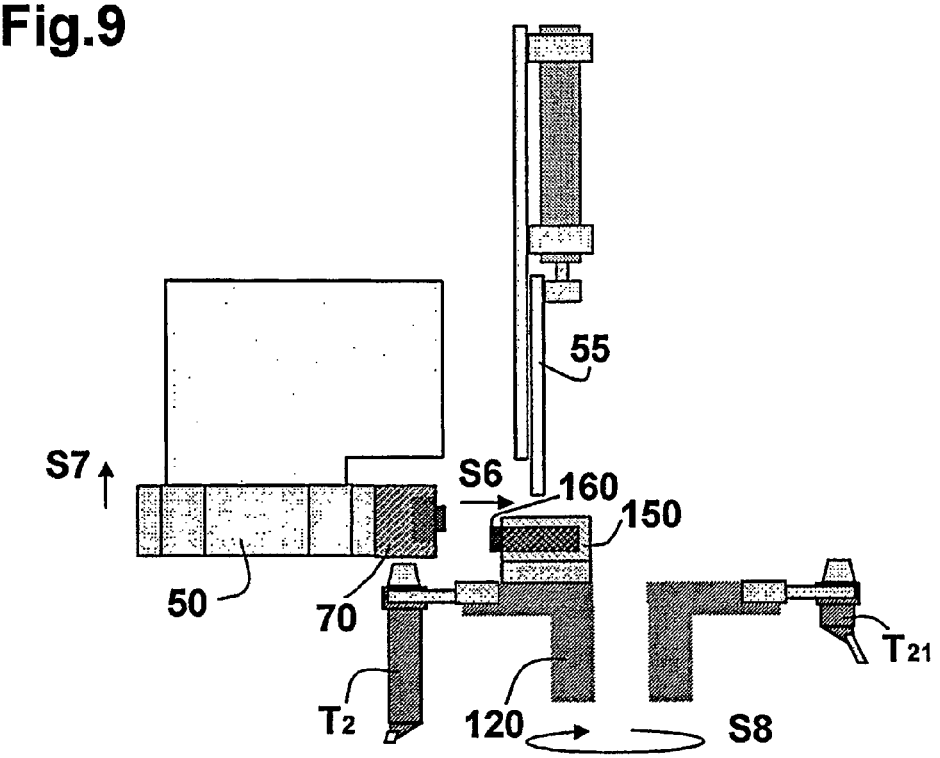
FIG. 9 is an explanatory view showing the operation of the automatic tool changer apparatus according to the present invention.
Figure 10:
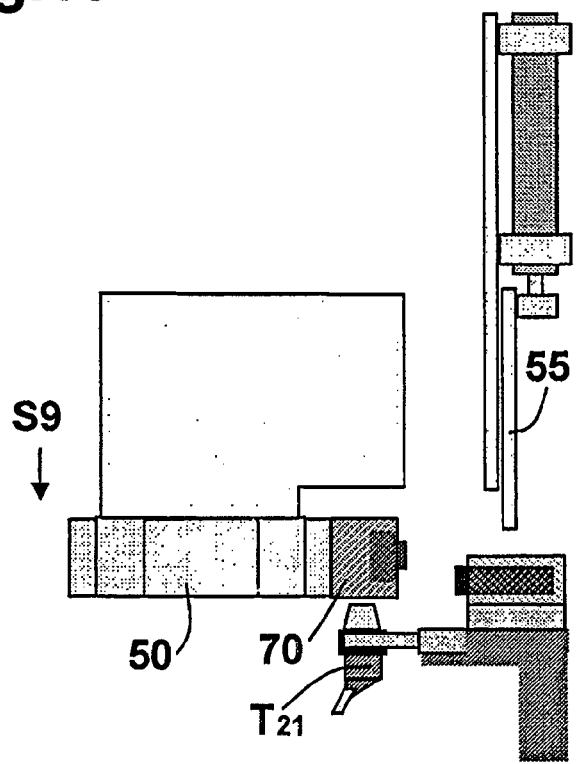
FIG. 10 is an explanatory view showing the operation of the automatic tool changer apparatus according to the present invention.
Figure 11:
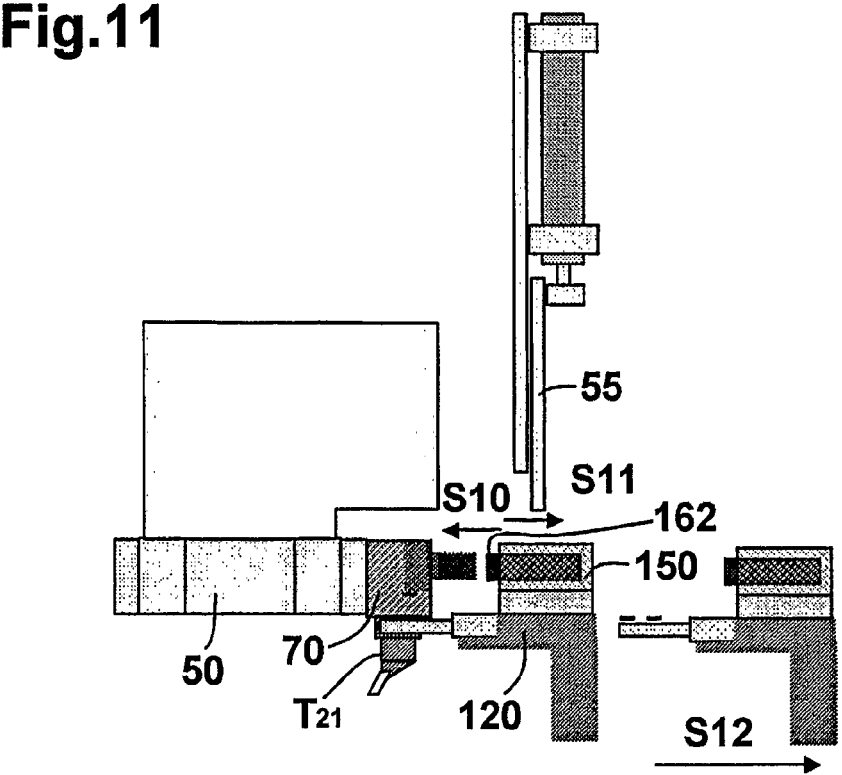
FIG. 11 is an explanatory view showing the operation of the automatic tool changer apparatus according to the present invention.
Figure 12:
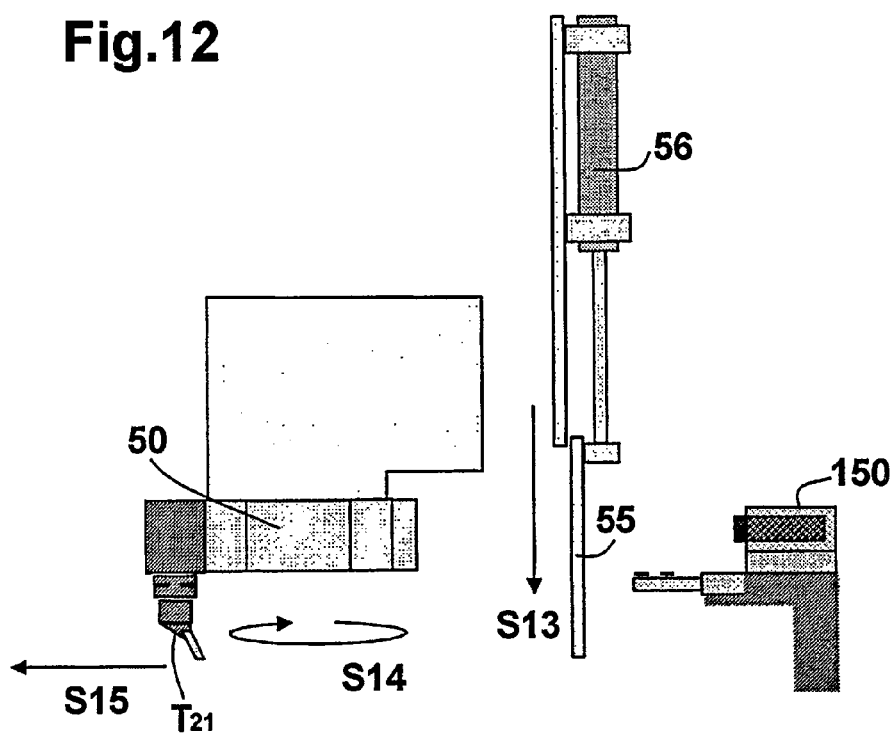
FIG. 12 is an explanatory view showing the operation of the automatic tool changer apparatus according to the present invention.

FIG. 6 is an explanatory view showing the external view of the tool holder 70, and FIG. 7 is a cross-sectional view showing the structure of the tool holder unit 80 disposed within the tool holder 70.

The tool holder unit 80 has a shank hole 82 formed within the housing corresponding to a tool shank, and a click 84 capable of moving in the axial direction disposed in the shank hole 82. The click 84 interlocks with a piston 86, and a pair of hydraulic ports $P_1$ and $P_2$ is located at either side of the piston 86.

By supplying hydraulic oil to the first port $P_1$, the click 84 slides back together with the piston 86, and clamps the shank of the tool inserted to the shank hole 82. Once the clamped state is realized, the clamp is self-locked via the piston 86 and a wedge member 88. By supplying hydraulic oil to the second port $P_2$, the piston 86 and the click 84 are moved forward and the shank of the tool is unclamped.

According to the tool holder 70 used in the present invention, the pins 74 and 76 are alternately pushed in, by which the hydraulic oil filled therein is supplied to port $P_1$ or port $P_2$ via a circuit not shown so as to clamp or unclamp the tool shank.

The operation of the automatic tool changer apparatus according to the present invention will be described with reference to FIGS. 8 through 12.

In step S1, the turret tool rest 50 is moved to the original point of ATC (automatic tool change).

In step S2, the turret tool rest 50 is allocated.

In step S3, the ATC door 55 is opened.

In step S4, the magazine 120 of the automatic tool changer apparatus is advanced, and the tool $T_2$ is received via the gripper 130.

In step S5, the unclamping piston 160 is projected so as to unclamp the tool on the tool holder 70.

In step S6, the unclamping piston 160 is pulled back.

In step S7, the turret tool rest 50 is moved in the +Z direction.

In step S8, the magazine 120 is turned.

In step S9, the turret tool rest 50 is moved to the original point of ATC.

In step S10, the clamping piston 162 is projected so as to clamp a tool $T_{21}$.

In step S11, the clamping piston 162 is pulled back.

In step S12, the magazine 120 is pulled back.

In step S13, the ATC door 55 is closed.

In step S14, the turret tool rest 50 is allocated.

In step S15, the turret tool rest 50 is moved to the machining position.

By the above-mentioned operation, the automatic tool change of the tool is completed. Further, during machining of the outer diameter of the work, the tool on the tool holder 70 is removed so as to prevent the tools from interfering with the workpiece without fail.

What is claimed is:

1. A vertical turret lathe having a work table holding a workpiece and rotating, a working head moving in X-axis and Z-axis directions, and a turret tool rest disposed on the working head within a machining area, the vertical turret lathe comprising:

a tool holder disposed on a tool attachment portion on the turret tool rest, and an automatic tool changer apparatus disposed outside the machining area for automatically changing the tools on the tool holder, wherein the tool holder comprises a pair of mechanically operated pins, and a means for clamping or unclamping the tool via hydraulic pressure in response to the operation of the pins, and a pair of cylinders for operating the pins on the tool holder, wherein the automatic tool changer apparatus comprises a frame, a slide rail disposed on the frame and extending horizontally in a direction toward the machining area, an automatic tool changer unit moving on the slide rail and changing tools within the machining area, and a door for allowing the automatic tool changer unit to enter the machining area, and wherein the automatic tool changer unit comprises a turret-type tool magazine facing the tool holder for changing the tools, and the turret-type tool magazine further comprises a gripper for gripping the tool and a spring for biasing the gripper towards the closing direction.

2. The vertical turret lathe according to claim 1, wherein the tool attached to the tool holder is an inner diameter turning tool.

3. The vertical turret lathe according to claim 1, wherein the pair of cylinders are disposed on the automatic tool changer unit.

* * * * *